March 23, 1954

W. C. WEHNER 2,673,122

LAWN SPRINKLER

Filed April 19, 1951

INVENTOR.
WILLIAM C. WEHNER
BY
Burton & Parker
ATTORNEYS

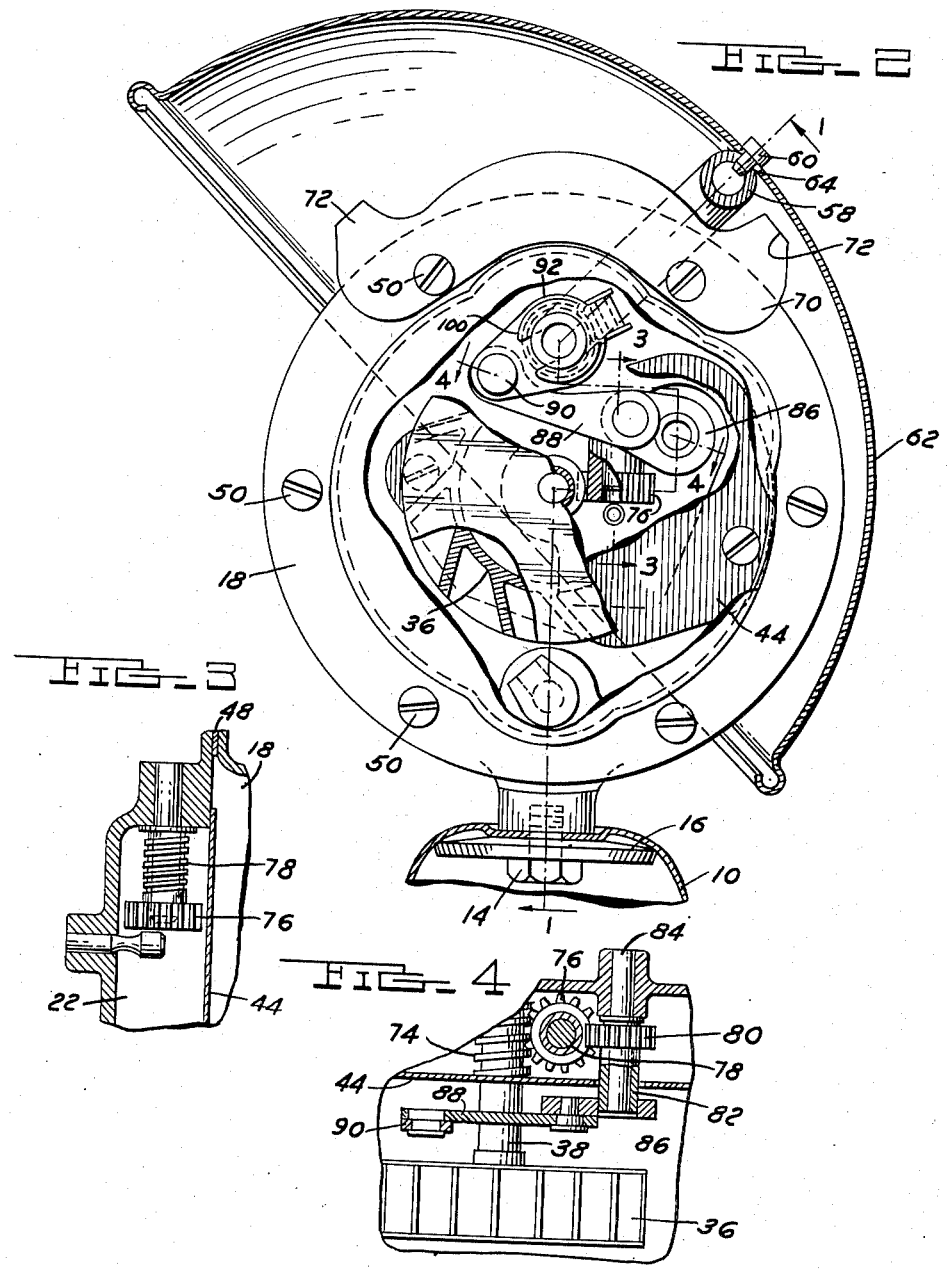

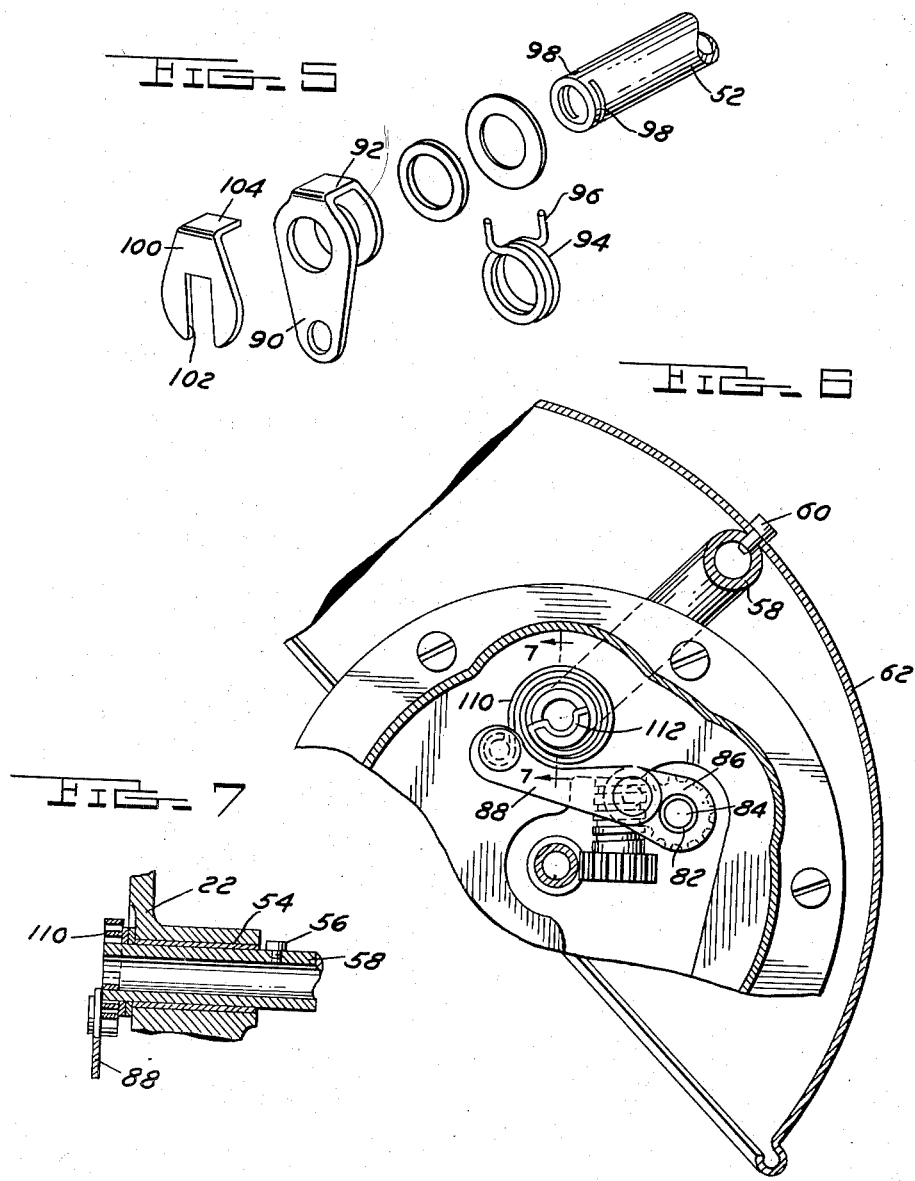

Patented Mar. 23, 1954

2,673,122

UNITED STATES PATENT OFFICE 2,673,122

LAWN SPRINKLER

William C. Wehner, Grosse Pointe, Mich.

Application April 19, 1951, Serial No. 221,791

5 Claims. (Cl. 299—67)

This invention relates to an improved lawn sprinkler.

An object is to provide a lawn sprinkler which is of simple and rugged construction and which comprises a spray head exhibiting a row of water discharge nozzles which head is supported for oscillation so that the spray will cover a substantial area of lawn and wherein a water motor is mounted within the sprinkler body to be driven by a stream of water from the hose entering the body and which motor is so coupled with the head as to oscillate the head but the head may be held against oscillation without stopping the motor.

It is frequently desirable to move a lawn sprinkler from one place to another without shutting off the water supply thereto and this sprinkler is so constructed that such may be done. The driving connection between the water motor and the sprinkler head whereby the head is oscillated in response to the rotation of the impeller or rotor of the motor is such that while the head is normally oscillated in response to rotation of the impeller the head may be grasped by an attendant and held tilted to one side of its oscillatory swing while permitting the impeller to continue to run.

More specifically, there is a yielding coupling within the drive between the impeller and the oscillating head which normally oscillates the head but which will yield when the head is held stationary to one side of its swing so as to permit the impeller to continue to rotate in response to water received within the water chamber and the water will continue to be discharged from the head but directed outwardly in the direction in which the head is pointed.

Another object is the provision of a lawn sprinkler of the character described wherein the sprinkler is provided with a body built up out of two cup-shaped portions secured cooperatively together to define an interior separated into a water chamber portion and a gear chamber portion. The driving mechanism includes an impeller mounted within the water chamber portion to rotate in response to a water stream entering therein through the water inlet. This impeller is coupled with the oscillating head by driving mechanism which includes gears within the gear chamber portion and linkage within the water chamber portion whereby the head is normally oscillated in response to rotation of the impeller but may be held stationary while the impeller continues to run.

Another object is the provision of a lawn sprinkler of the character set forth wherein the sprinkler head is formed by a water pipe built into a generally V or U shape. One leg of the U pipe is straight and is journaled within the body of the sprinkler for oscillation in response to the rotation of the impeller. The end of such leg is open to the water chamber side of the interior of the body to receive water therefrom. The other leg of the pipe is bent into an arcuate shape to overhang the body and is provided with a series of water outlets arranged along its length. The outer end of the pipe is provided with a plug which depends in the form of a weight to a point below the journaled support of the pipe to counterbalance the upper portion of the pipe which overhangs the body.

A meritorious feature of the head is the provision of a dome-shaped element. This element is of a generally hemispherical shape. It is seated upon the arcuate portion of the pipe. The dome is cut away to define a diametrical slot which superimposes the pipe and the discharge outlets in the arcuate portion of the pipe project upwardly through said slot. This dome-shaped element as it projects outwardly and downwardly from the arcuate portion of the pipe provides hand grip portions which may be grasped to hold the head tilted to one side of its swing.

The impeller is of an improved character whereby the vanes that are struck by the water stream are disposed between a pair of side plates so that the stream is confined and the maximum power is developed.

That portion of the spray head water pipe which is journaled within the body is provided with packing which maintains a tight seal and which is designed to facilitate rotation while tightly sealing the pipe against leakage.

Other objects, advantages and meritorious features will more fully appear from the following description, claims and accompanying drawings, wherein:

Fig. 2 is a fragmentary elevation taken at an angle of 90° with respect to view of Fig. 1 and partly broken away to show driving mechanism within the interior of the body;

Fig. 3 is a fragmentary vertical section taken on the line 3—3 of Fig. 2;

Fig. 4 is a fragmentary angular section taken on the line 4—4 of Fig. 2;

Fig. 5 is an exploded view of parts mounted on the sprinkler head water tube which constitute part of the drive mechanism and being the construction shown in Figs. 1 and 2;

Fig. 6 is a fragmentary section taken from the same plane as Fig. 2 but showing a modified form of drive mechanism as compared with Figs. 1 and 2;

Fig. 7 is a fragmentary section taken on the line 7—7 of Fig. 6.

Figure 1:
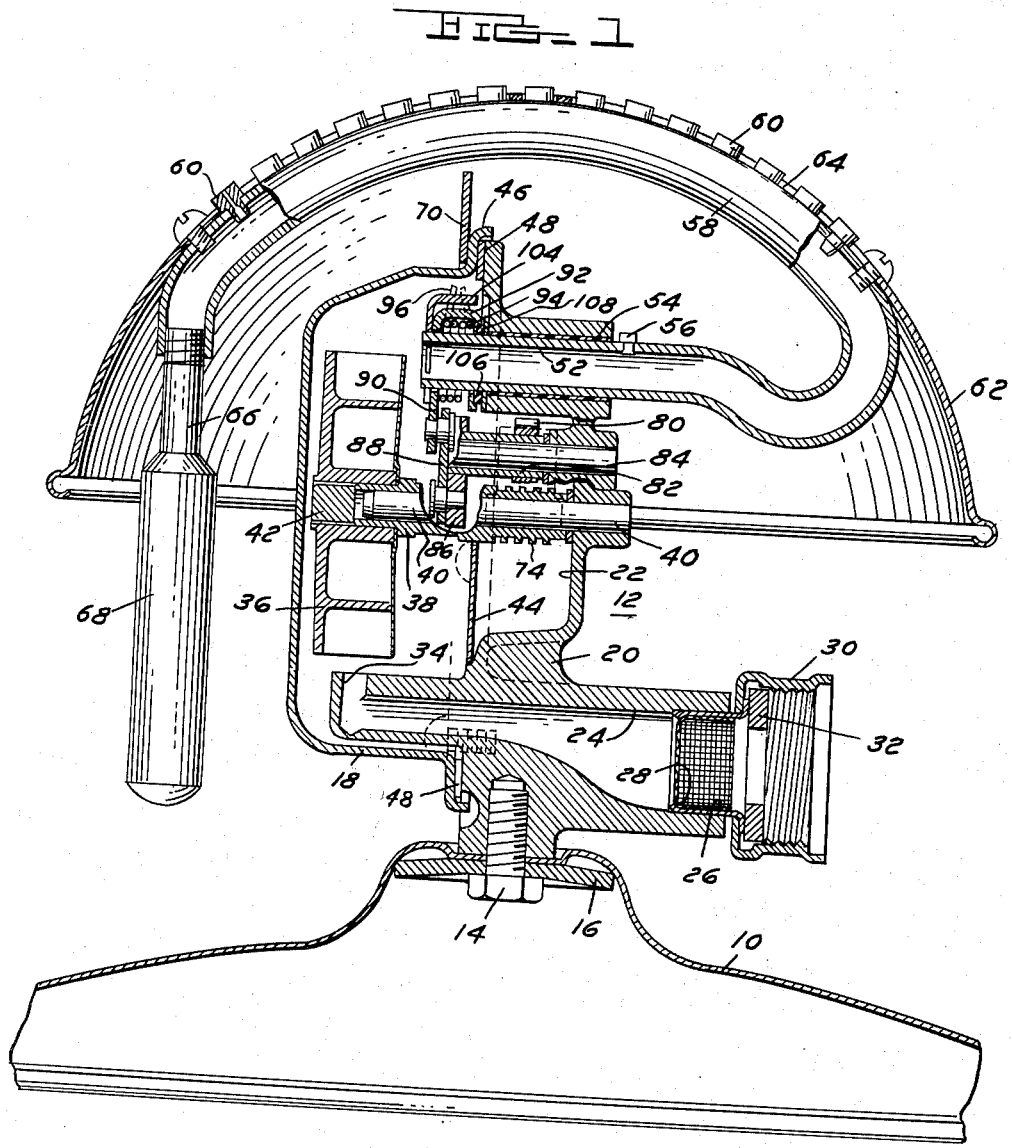
Fig. 1 is a vertical sectional view taken on the line 1—1 of Fig. 2.

The sprinkler is shown as embodying the base 10 which supports a body 12 by means of a stud screw 14 extending upwardly through the base and through a washer 16 within the base and into the body, all as shown in Fig. 1. The washer serves to distribute the thrust if one picks up the sprinkler from the dome or applies a pressure which is distributed to the base.

The body 12 of the sprinkler is formed of two cup-shaped portions 18 and 20. The portion 20 is a casting which is formed to provide a cup-shaped part 22 which serves as a gear chamber portion. Such portion 20 also defines a water inlet 24 which has a nipple 26 press-fitted thereinto. Within the nipple 26 is a screen 28. A hose coupling 30 is rotatably journaled upon the nipple. This hose coupling is interiorly threaded and carries a packing ring 32. The inner end of the water inlet terminates in a jet 34 adapted to direct a stream of water against a rotor or impeller 36. This rotor has a pair of side plates between which the vanes are mounted so that the full force of the stream of water is utilized and sufficient power is developed with the small size impeller shown. The impeller is fixed upon a sleeve 38. This sleeve is journaled upon a fixed shaft 40. The sleeve is not shown as extending entirely through the impeller, but the outer end of the sleeve opening in the impeller is closed by a plug 42.

The interior of the body between the two cup-shaped portions 18 and 20 is separated into two chambers by a partition wall 44. The cup-shaped portion 18 is shown as having a margin 46 shaped to overhang the margin of the portion 20 and a gasket 48 is interposed between these marginal portions of the two cup-shaped elements and such elements themselves are secured together by stud screws 50 as shown in Fig. 2.

The spray head comprises a water pipe element which has one end 52 journaled within the casting portion 20 of the body as shown in Fig. 1. 54 indicates a bushing which may be formed of nylon or the like in the form of a flat sheet bent about the bearing portion of the pipe. The end of the pipe extends into the interior of the body and opens into the water chamber portion as shown to receive water therefrom. A lug 56 is secured to the pipe to afford a positive stop to its inward extension. The pipe extends outwardly away from the body and is bent into an arcuate shape providing an arcuate portion 58 which arcuate portion is disposed in the same plane as the journaled portion of the pipe, but overhangs the body as illustrated in Fig. 1. This arcuate portion of the pipe is fitted with a plurality of spray nozzle jets 60 disposed in line as shown.

The spray head portion further comprises a generally hemi-spherical dome-shaped element 62. This dome 62 is cut away to provide a diametrical slot 64 which overhangs the arcuate portion 58 of the pipe and through which the nozzles 60 extend as shown.

The outer end of the arcuate portion 58 of the pipe is closed by a plug 66 threaded thereinto as shown in Fig. 1. This plug depends a substantial distance in the form of a weighted portion 68 which is disposed below the journaled support of the end 52 of the pipe, all as shown in Fig. 1. This weighted portion constitutes a counterbalance which serves to maintain the upper arcuate portion of the pipe in its upright position. This plug may also be removed for cleaning the arcuate portion of the pipe.

The spray head is adapted to be oscillated in response to the rotation of the impeller and throughout a determined swing as provided by the driving mechanism which connects the impeller with the spray head. There is provided, however, positive stops to afford limits to this swing in the form of a part 70 shown in Fig. 2 as secured by two of the screws 50 to the body. This part 70 has outwardly turned ends 72 which are disposed in the line of swing of the arcuate portion 58 of the pipe as shown in Fig. 2.

The driving mechanism which couples the impeller with the spray head to oscillate the same includes a worm gear 74 formed on the sleeve 38 upon which sleeve the impeller is fixed. This worm gear 74 drives a rotatably supported gear 76 which gear 76 has a vertical hub provided with a worm 78 which worm in turn drives a gear 80. The gear 80 is fixed to a sleeve 82 which sleeve is journaled upon a fixed shaft 84.

This sleeve extends rotatably through the partition 44 and on its outer end is fixed a crank arm 86 to rotate with the sleeve. The sleeve is, of course, driven through the train of gears 74, 76, 78 and 80 heretofore described as located within the gear chamber.

This crank arm 86 is connected by link 88 with the driven arm 90 which arm 90 is journaled upon the end 52 of the water pipe that projects into the water chamber, all as shown in Fig. 1. This arm 90 is shown in its specific form in Fig. 5. It has a crown portion 92 which is received over the pipe 52 and a coil spring element 94 is adapted to be sleeved over the pipe 52 as shown in Fig. 1. The two ends of the spring element indicated as 96 are spaced apart and bracket the crown portion 92 on the arm 90 as shown in Fig. 1.

The end of the pipe 52 is provided with slots 98 and a clip arm 100 is slotted as at 102 to be received within the slots 98 to secure the clip arm to the pipe to oscillate therewith. The clip arm has a lug part 104 which is adapted to overhang the crown 92 of the arm 90 and be disposed between the ends 96 of the spring so that through the spring ends 96 the arm 90 which is freely journaled on the pipe 52 is held yieldingly to the arm-like clip 100 so that normally the arm 100 and the arm 90 oscillate as one piece. If the spray head is grasped and held against oscillation while the impeller is rotating the ends 96 of the spring may spread apart through the resiliency provided in the coil portion 94 of the spring and will spread sufficiently to permit the arm 92 to continue to oscillate in response to the rotation of the impeller but without producing any oscillation of the arm 100 or the pipe 52.

There is mounted upon the pipe 52 a packing ring 106 which may be formed of neoprene or other suitable material. This packing ring as shown is received in part within a recess in a portion of the arm 90. A bearing washer 108 which may be formed of nylon or the like is shown as bearing against the packing washer and taking the thrust thereof. There will be an endwise thrust against the pipe 52 due to the water pressure within the water chamber and this is taken by the washer 108.

Figs. 6 and 7 illustrate an alternative modification as to the yieldable portion of the drive mechanism heretofore described in connection with Figs. 1 and 2. That portion of the drive mechanism which resides in the impeller 36, sleeve 38, shaft 40, gears 74, 76, 78, 80, sleeve 82 and shaft 84 is the same in Figs. 6 and 7 as in the earlier figures of the drawing and the sleeve 82 is provided on its outer end with crank arm 86 which has pivoted thereto link 88, all as heretofore described, but in the first described modification the water pipe 52 is provided with a pair of arms 90 and 100 which are yieldingly connected together by the spring 94.

In the construction of Figs. 6 and 7 the link 88 has one end of a coil spring 110 secured thereto and the opposite end of this coil spring is fastened as at 112 to the end of the pipe 58. The tension in this spring is such that as the link 88 is reciprocated due to the rotation of the crank arm 86 by the shaft element 82 the spray head water pipe 52 is oscillated. If one takes hold of the spray head and stops the oscillation of the pipe 58 the link 88 can continue to reciprocate and the impeller can continue to rotate and this movement will be taken up in the winding and unwinding of the spring 110. This modification therefore accomplishes the same result and provides a similar yield in the drive mechanism to that provided in the modification shown in Figs. 1 through 4.

What I claim is:

1. A lawn sprinkler having a body defining a water chamber provided with a water inlet, an impeller journaled within the chamber to be rotatably driven by a water stream from the inlet, a spray head journaled within the body for oscillation and provided with a water conduit portion opening into the chamber to receive water therefrom and a discharge portion projecting outwardly beyond the body and exhibiting a plurality of water outlets, driving mechanism coupling the head with the impeller for oscillatory swinging of the head upon rotation of the impeller, said driving mechanism including a link coupled with the impeller to be reciprocated thereby, a flat spiral spring connected at one end with said link and at the opposite end with that portion of the head within the chamber to oscillate the head upon reciprocation of the link but yieldable to wind and unwind upon the head being held against oscillation while permitting continued reciprocation of the link.

2. A lawn sprinkler comprising a body defining a water chamber provided with a water inlet, an impeller journaled within the chamber to be rotatably driven by a water stream from the inlet, a spray head journaled within the body for oscillatory movement in relation thereto and communicating with said water chamber, said spray head including an open-ended arcuate discharge pipe embodying a plurality of spaced openings and a plug closing the open end of said pipe, said plug including a counterweight portion disposed below the journal support for the spray head and lying normally in a vertical plane passing through said journal, and driving means so coupling the spray head with the impeller that rotation of the latter normally produces oscillation of the former, said coupling including means yieldable to permit continued rotation of the impeller while the spray head is stationary.

3. A lawn sprinkler comprising a body defining a water chamber provided with a water inlet, an impeller journaled within the chamber to be rotatably driven by a water stream from the inlet, a spray head journaled within the body for oscillatory movement in relation thereto and communicating with said water chamber, a counterweight secured to said spray head and normally disposed below its journal support in a vertical plane passing therethrough, and driving means so coupling the spray head with the impeller that rotation of the latter normally produces oscillation of the former, said coupling including means yieldable to permit continued rotation of the impeller while the spray head is stationary.

4. A lawn sprinkler comprising a body defining a water chamber provided with a water inlet, an impeller journaled within the chamber to be rotatably driven by a water stream from the inlet, a spray head journaled within the body for oscillatory movement in relation thereto and communicating with said water chamber, said spray head comprising a dome-shaped element having a plurality of spaced discharge openings extending arcuately across its surface, and driving means so coupling the spray head with the impeller that rotation of the latter normally produces oscillation of the former, said coupling including means yieldable to permit continued rotation of the impeller while the spray head is stationary.

5. A lawn sprinkler comprising a body defining a water chamber provided with a water inlet, an impeller journaled within the chamber to be rotatably driven by a water stream from the inlet, a spray head journaled within the body for oscillatory movement in relation thereto and communicating with said water chamber, said spray head comprising a dome-shaped element having a plurality of spaced discharge openings extending arcuately across its surface, a counterweight secured to said head and normally disposed below its journal support in a vertical plane passing therethrough, and driving means so coupling the spray head with the impeller that rotation of the latter normally produces oscillation of the former, said coupling including means yieldable to permit continued rotation of the impeller while the spray head is stationary.

WILLIAM C. WEHNER.

References Cited in the file of this patent

UNITED STATES PATENTS

| Number | Name | Date |
|---|---|---|
| 1,517,664 | Bergquist | Dec. 2, 1924 |
| 1,534,979 | McGee | Apr. 21, 1925 |
| 1,677,228 | Coles | July 17, 1928 |
| 1,862,576 | Ludlam | June 14, 1932 |
| 2,132,314 | Needler | Oct. 4, 1938 |
| 2,336,425 | Shenton | Dec. 7, 1943 |
| 2,546,241 | Squiers | Mar. 27, 1951 |

OTHER REFERENCES

Skinner: Irrigation Spray Wave Sprinkler (1942).